R. B. LOUIS.
PATCH FOR COTTON BALES.
APPLICATION FILED NOV. 20, 1917.

1,290,605.

Patented Jan. 7, 1919.

INVENTOR
Rube B. Louis
BY
Hardway Carter
ATTORNEYS.

UNITED STATES PATENT OFFICE.

RUBE B. LOUIS, OF HOUSTON, TEXAS.

PATCH FOR COTTON-BALES.

1,290,605.  Specification of Letters Patent.  Patented Jan. 7, 1919.

Application filed November 20, 1917. Serial No. 202,958.

*To all whom it may concern:*

Be it known that I, RUBE B. LOUIS, a citizen of the United States, residing at Houston, in the county of Harris and State of Texas, have invented certain new and useful Improvements in Patches for Cotton-Bales, of which the following is a specification.

This invention relates to new and useful improvements in a patch for cotton bales.

The object of the invention is to provide a device of the character described designed for the purpose of closing the opening cut through the covering of a cotton bale to obtain samples from the bale.

As is well known, bales of cotton when they come from the gin or compress are covered with a loosely woven fabric covering, and in order to obtain samples, to determine the quality of the cotton in the bales, it is necessary to cut a slit through said covering, and after the cotton has been sampled, this slit should be securely closed in order to prevent the waste and theft of cotton through said slit. For the purpose of closing this slit and preventing said waste, and preventing the theft of samples of cotton which might be taken from the bale, this patch has been devised for the purpose of securely closing said slit.

A further feature of the invention resides in the provision of a patch of the character described that will be light in weight, cheaply and easily constructed, and one which may be securely fastened to the bale over said slit and easily removed therefrom.

With the above and other objects in view, the invention has particular relation to certain novel features of construction and use, an example of which is given in this specification, and illustrated in the accompanying drawings, wherein:—

Figures 1, 3:
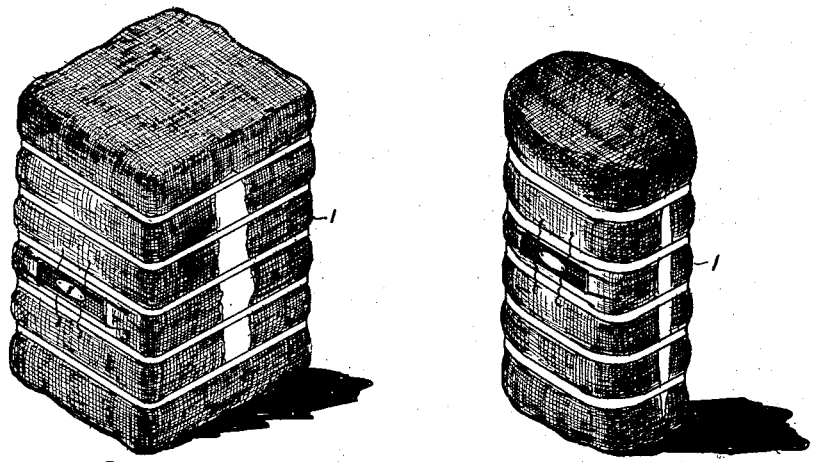
Figure 1 shows a perspective view of a cotton bale as it comes from the cotton gin.
Fig. 3 shows the bale as it comes from the compress.
Figure 2:
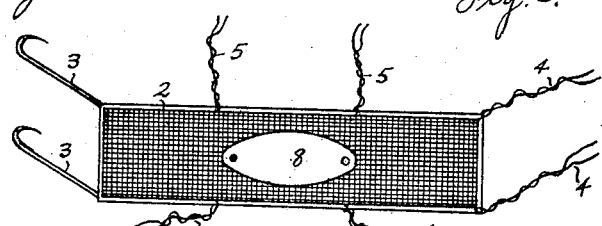
Fig. 2 shows a plan view of a type of patch employed for the purpose of closing the slit in the covering of said bale.
Figure 4:
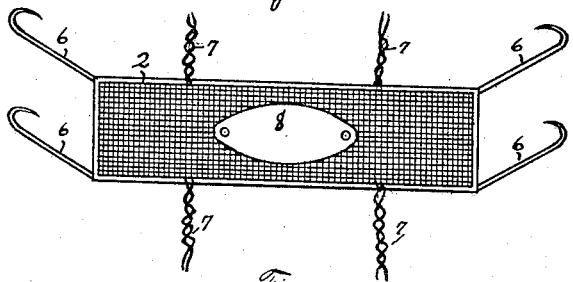
Fig. 4 shows a plan view of the form of patch on the compressed bale.

Referring now more particularly to the drawings wherein like numerals of reference designate similar parts in each of the figures. The numeral 1 refers to a bale of cotton before same has been compressed. In making sales of cotton the bales are sampled in order to determine the quality of cotton therein and in order to obtain the samples, the fabric covering, which is secured around the bale, must be slitted. After the cotton has been sampled the slit should be closed as otherwise loose cotton will be wasted and stolen through the slit. For the purpose of closing this slit, I have provided the patch 2 which is preferably formed of light wire mesh. The form of patch designed to be used on the ordinary square bale shown in Fig. 1 is provided with the hooks 3, 3, at one end designed to engage in the fabric covering. When these hooks are engaged, the patch is then placed over the slit and at its other end it is provided with tie wires 4, 4, which are secured around the strands of the fabric covering. The sides of the patch are also provided with tie wires 5, 5, provided to be secured and tied around corresponding strands of the fabric covering to secure the patch closely against the bale.

The form of patch designed for use on compressed bales, as shown in Fig. 3, has a pair of hooks 6, 6, at each end, which are engaged in the fabric covering of the bale to hold the ends of the patch against the bale. This form of patch also has the tie wires 7, 7, at each edge which are secured and tied around the strands of the fabric covering and the patch thereby held in place against the bale over the slit cut through the fabric covering. The plate 8 may be secured to the patch for the purpose of containing the number of the bale and the name and address of the shipper so that when the patch is removed from the bale, if desired, it may be returned to the owner.

A patch of the character described is light in weight, is cheaply and easily manufactured, and may be readily applied or removed from the bale.

What I claim is:

1. A patch for closing the slit in the covering of a cotton bale formed of open wire mesh, a designation plate carried by said patch, securing hooks provided at one end thereof and means provided at the opposite end and sides whereby the patch may be secured to the fabric covering of the bale.

2. A patch for closing the slit in the covering of cotton bales, said patch being formed of open wire mesh, through which the cotton may be inspected, and means provided at the margins of the patch whereby said patch is secured to the covering of the bale.

3. A patch for closing a slit in the covering of a cotton bale formed of open wire mesh, through which the cotton may be inspected, means carried by the ends of patch for engaging with the covering of the bale and ties at each side of said patch, said ties being formed of wires which extend beyond said patch and provided to be tied around the strands of the bale covering to secure the patch in position.

In testimony whereof I have signed my name to this specification in the presence of two subscribing witnesses.

RUBE B. LOUIS.

Witnesses:
 W<small>M</small>. A. C<small>ATHEY</small>,
 R. A. B<small>ROWN</small>.

Copies of this patent may be obtained for five cents each, by addressing the "Commissioner of Patents, Washington, D. C."